United States Patent
Uekusa

(12)
(10) Patent No.: US 6,388,828 B1
(45) Date of Patent: May 14, 2002

(54) METHOD AND APPARATUS FOR MAGNETICALLY RECORDING INFORMATION ON PHOTOGRAPHIC FILM

(75) Inventor: Tadashi Uekusa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 08/711,074

(22) Filed: Sep. 9, 1996

Related U.S. Application Data

(63) Continuation of application No. 08/389,655, filed on Feb. 16, 1995, now abandoned.

(30) Foreign Application Priority Data

Feb. 16, 1994  (JP) .............................................. 6-019264

(51) Int. Cl.$^7$ .............................. G11B 5/00; G03B 13/04
(52) U.S. Cl. .......................................... 360/1; 396/319
(58) Field of Search ........................ 360/3, 1; 354/105, 354/106; 355/41, 42; 396/319

(56) References Cited

U.S. PATENT DOCUMENTS

| | | | | |
|---|---|---|---|---|
| 4,613,911 A | * | 9/1986 | Ohta | 360/3 |
| 5,347,403 A | * | 9/1994 | Vekusa | 360/3 |
| 5,450,149 A | * | 9/1995 | Cocca | 354/106 |
| 5,453,805 A | * | 9/1995 | Itoh | 354/106 |
| 5,502,527 A | * | 3/1996 | Kazami et al. | 354/106 |
| 5,559,568 A | * | 9/1996 | Kazami et al. | 396/319 |
| 5,649,249 A | * | 7/1997 | Yoshida | 396/319 |

FOREIGN PATENT DOCUMENTS

| | | | | |
|---|---|---|---|---|
| JP | 4502518 | 5/1992 | ........... G03B/31/00 |

* cited by examiner

*Primary Examiner*—Regina Y. Neal
(74) *Attorney, Agent, or Firm*—Sughrue Mion, PLLC

(57) ABSTRACT

A method and apparatus for recording an information on magnetic recording tracks, called camera tracks, formed on a photographic negative film while relative movement is caused between the photographic negative film and a magnetic head. When the magnetic head is located in an information recording region of the camera tracks, a signal of the information representing photographing conditions of each image frame such as the aspect ratio of each frame, exposure amount at the time of photographing, information on a light source, etc., is output to the magnetic head via a modulator and a recording current amplifier. When the magnetic head is located in an non-recording region of the camera tracks, direct current having a magnitude substantially equal to the optimal recording current of the magnetic head or alternating current having the frequency which is not less than 5 times the frequency of the signal is output to the magnetic head via the modulator and the recording current amplifier.

21 Claims, 9 Drawing Sheets

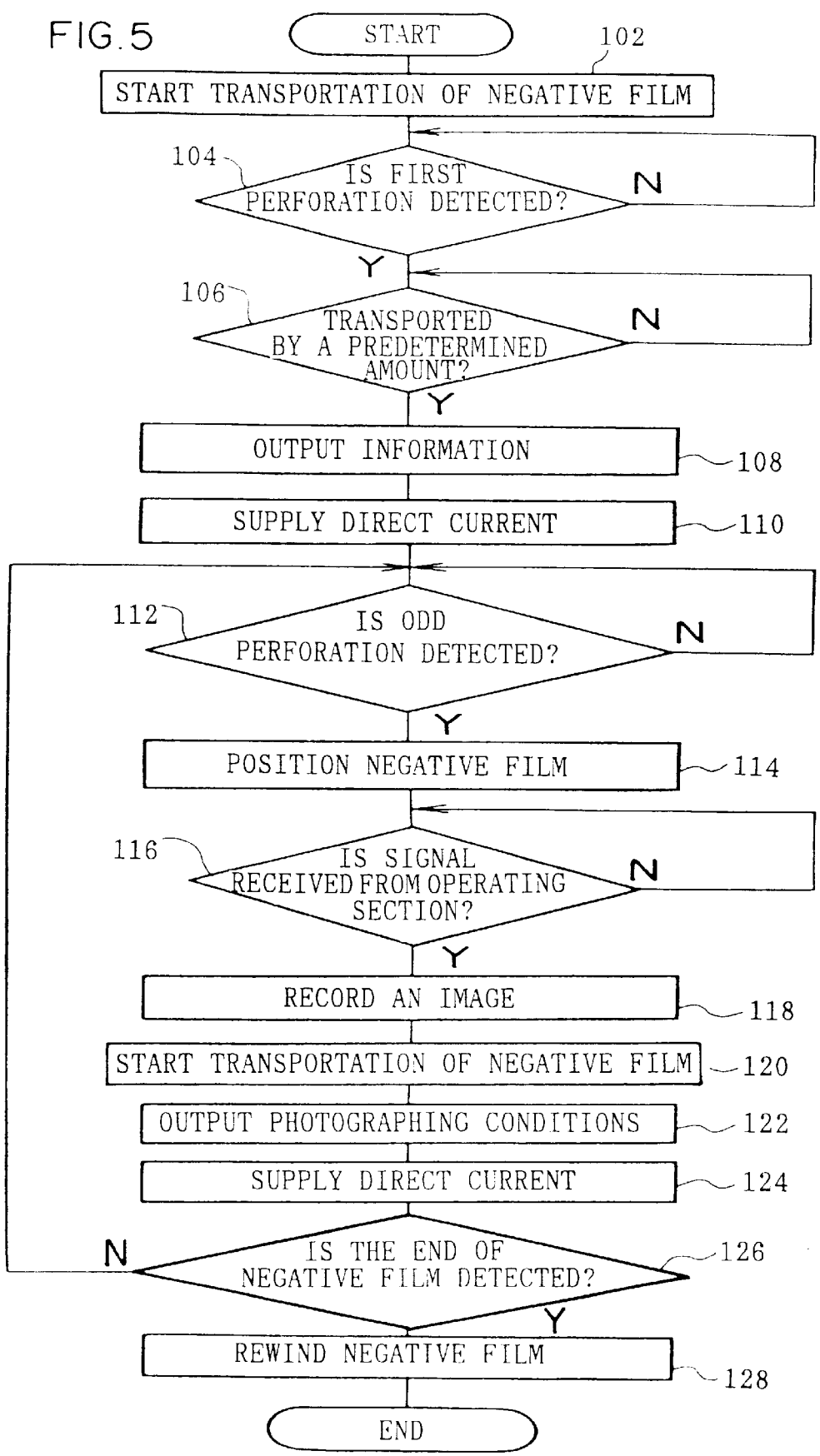

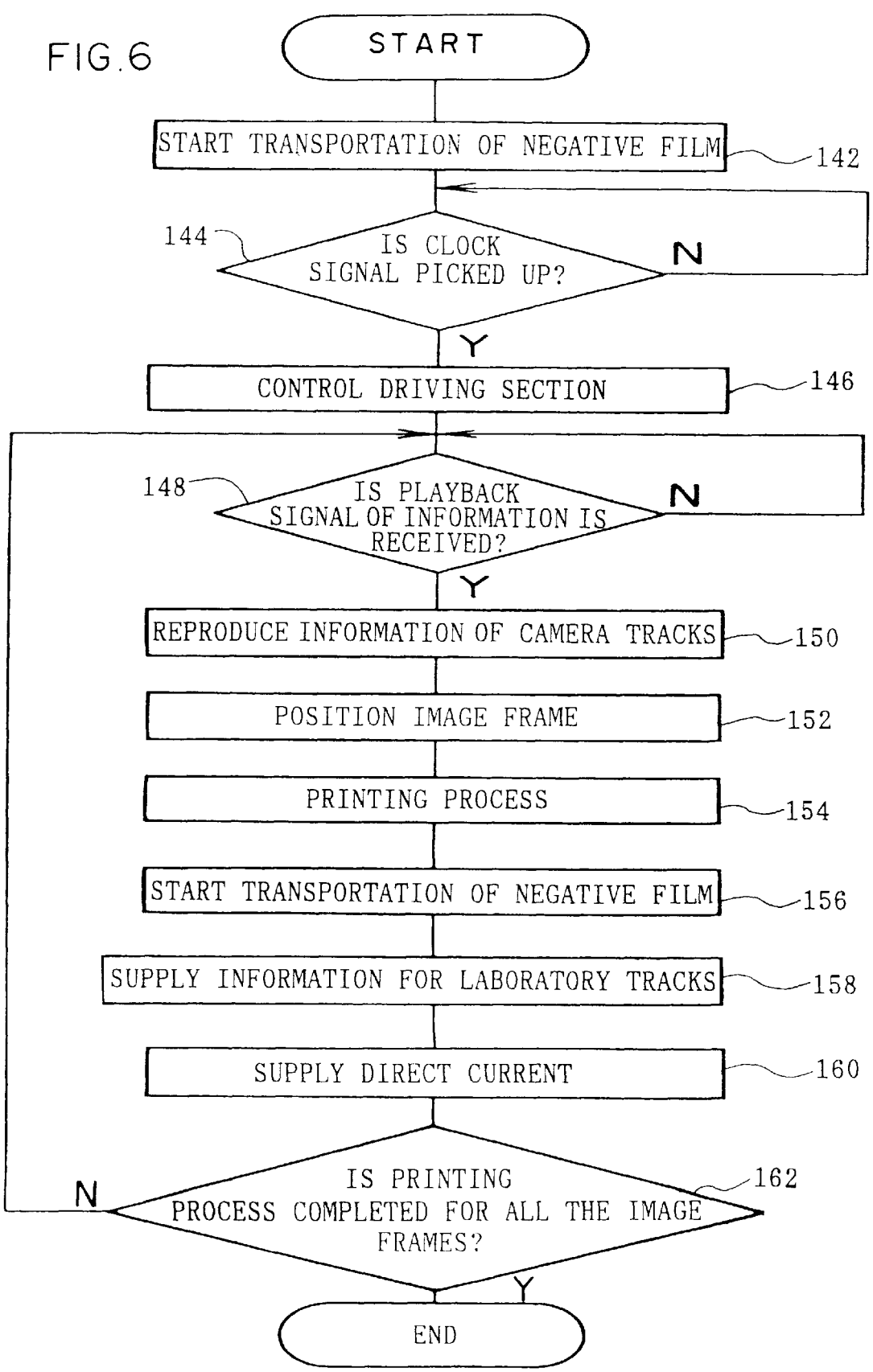

METHOD AND APPARATUS FOR MAGNETICALLY RECORDING INFORMATION ON PHOTOGRAPHIC FILM

This is a Continuation of application Ser. No. 08/389,655 filed Feb. 16, 1995 now abandoned.

BACKGROUND OF THE INVENTION

1. Field of the Invention

The present invention relates to an information recording method and apparatus therefor, and more particularly to a method and apparatus for recording an information on a magnetic track on a photographic negative film by supplying a magnetic head with a signal corresponding to the information to be magnetically recorded on the magnetic track.

2. Related Art

PCT Application Laid-Open No. 4-502518 discloses that a magnetic recording section including so-called camera tracks and so-called processing laboratory tracks is formed by applying a transparent magnetic substance to a photographic negative film, and an information regarding a negative film and an information regarding images recorded on the negative film are recorded on the camera tracks and the laboratory tracks. According to this PCT application, an information regarding an image can be recorded on the magnetic recording section at a location physically corresponding to the location of a corresponding image frame in which the image is recorded, so that the information can be searched quite easily. On the camera tracks of the magnetic recording section, the date and time of photographing, the place of photographing, the conditions for photographing, and the like can be recorded for each image when the photographic negative film is rewound after completion of the photographing. In a processing laboratory, each image on a frame is tested or collated by a photographic negative film tester or a collating apparatus to record a compensation value for exposure conditions on the processing laboratory tracks of the magnetic recording section. Moreover, when each image is printed on a photographic printing paper by a printer, an information such as exposure conditions for each image frame, which has been determined taking the above-described conditions for photographing, the compensation value, and the like into consideration, are recorded on the processing laboratory tracks. When a reprint is ordered, the recorded exposure conditions, etc., are read out so as to carry out a printing process under the same conditions of an original print.

The recording of information on the magnetic recording section is carried out in accordance with a so-called tri-bit method using two kinds of signals. In this tri-bit method, two kinds of signals corresponding to "0" and "1" are combined to form a signal for writing the information (hereinafter referred to as a "recording signal") of the date and time of photographing, the place of photographing, the conditions for photographing or the like of each image, or of exposure conditions or the like for each image frame. The signal is supplied to a magnetic head provided in a camera or a photographic printer. Such information is magnetically recorded on the camera tracks or the processing laboratory tracks by the magnetic head on the basis of the recording signal.

As shown in FIG. 11A, a recording signal corresponding to an information to be magnetically recorded on camera tracks is supplied to the magnetic head when the leading ends of the camera tracks C1 and C2 of a transported photographic negative film reach the magnetic head, and the supply of the recording signal is stopped when the recording of the information on the camera tracks C1 and C2 has been completed. Due to occurrence of chattering when the supply of the recording signal is started and stopped, noise often mixes into the recording signal between adjacent camera tracks. Also, when the processing laboratory tracks undergo an overwrite operation, the start code or end code of a previously recorded recording signal sometimes remains unerased. Accordingly, when the information magnetically recorded on the camera tracks is played back in the photographic printer, the noise is mixed in playback signals X1 and X2 of non-recording areas of the camera tracks, as shown in FIG. 11B. This makes it difficult to discriminate signals Y1, Y2, and Y3 read out from the camera tracks C1 and C2 from the mixed noise. This deteriorates the readability of information recorded on the camera tracks. The same problems occur when the information recorded on the processing laboratory tracks is played back.

SUMMARY OF THE INVENTION

The present invention has been accomplished to solve the above-described problems, and its object is to provide an information recording method and an apparatus for preventing a magnetically recording portion of a photographic negative film from mixing noise and improving consequently the readability of magnetically recorded information on a magnetic track, According to a first aspect of the present invention, there is provided an information recording method which includes the steps of causing relative movement between a photographic negative film provided with a magnetic track and a magnetic head, supplying the magnetic head with a signal corresponding to an information to be magnetically recorded so as to magnetically record the information in a first predetermined region of the magnetic track, recording the information on the first predetermined region of the magnetic track of the photographic negative film on the basis of the signal supplied to the magnetic head, supplying the magnetic head with one of direct current and alternating current when the magnetic head is located at a second predetermined region which is outside the first predetermined region, and operating the one of the direct current and the alternating current to the second predetermined region of the photographic negative film through the magnetic head.

According to a second aspect of the present invention, the frequency of the alternating current is more than 5 times the maximum frequency of the signal.

According to the third aspect of the present invention, the magnitude of the direct current is substantially equal to an optimal recording current of the magnetic head.

According to the fourth aspect of the present invention, there is provided an information recording apparatus which includes a magnetic head, moving means for causing relative movement between the magnetic head and a photographic negative film, and supplying means adapted to operate when the relative movement between the magnetic head and the photographic negative film having a magnetic track is being effected, so as to supply the magnetic head with a signal corresponding to information to be magnetically recorded when the magnetic head is located in a first predetermined region of the magnetic track on the photographic negative film to record the information on the first predetermined region of the magnetic track of the photographic negative film on the basis of the signal supplied to the magnetic head, and so as to supply the magnetic head with direct current or alternating current when the magnetic head is located outside the predetermined region of the magnetic track to operate the one of the direct current and the alternating current to the second predetermined region of the photographic negative film through the magnetic head.

In the first aspect, the relative movement is caused between the photographic negative film provided with the magnetic track and the magnetic head. Such relative movement between the photographic negative film and the magnetic head may be caused by moving both the photographic negative film and the magnetic head. Also, such relative movement may be obtained by moving the photographic negative film relative to the magnetic head which is maintained stationary. Moreover, such relative movement may be obtained by moving the magnetic head relative to the photographic negative film which is maintained stationary. While the relative movement between the photographic negative film and the magnetic head is continued, the signal corresponding to the information to be magnetically recorded is supplied to the magnetic head so as to magnetically record the information in a first predetermined region of the magnetic track. Also, one of the direct current and the alternating current is supplied to the magnetic head when the magnetic head is located at a second predetermined region which is outside the first predetermined region.

In the second aspect, the magnetic head is supplied with the alternating current having a frequency more than 5 times the maximum frequency of the signal corresponding to the information to be magnetically recorded when the magnetic head is located at the second predetermined region outside the first predetermined region.

In the third aspect, the magnetic head is supplied with the direct current having a magnitude substantially equal to an optimal recording current of the magnetic head when the magnetic head is located at the second predetermined region outside the first predetermined region.

In the fourth aspect, the moving means causes relative movement between the magnetic head and the photographic negative film provided with the magnetic track. The relative movement between the photographic negative film and the magnetic head can be caused in the above-described manner. In the state in which such relative movement is being continued between the magnetic head and the photographic negative film provided with the magnetic track, the supply means supplies the magnetic head with the signal corresponding to the information to be magnetically recorded when the magnetic head is located in the first predetermined region of the magnetic track on the photographic negative film. The magnetic head magnetically records the information corresponding to the signal in the predetermined region. Also, the supply means operates in the above-described state to supply the magnetic head with one of the direct current and the alternating current when the magnetic head is located at the second predetermined region outside the first predetermined region of the magnetic track.

As described above, one of the direct current and the alternating current is supplied to the magnetic head when the magnetic head is located at the second predetermined region outside the first predetermined region of the magnetic track on the photographic negative film. Accordingly, invasion of noise is prevented, and a signal corresponding to a recorded information is prevented from remaining on the magnetic track, thereby improving the readability of the information magnetically recorded on the magnetic track.

BRIEF DESCRIPTION OF THE DRAWINGS

FIG. 5 is a flowchart showing a control routine of the control circuit of the camera shown in FIG. 4;

FIG. 6 is a flowchart showing a control routine of a control circuit of a photographic printer;

FIGS. 7A, 7B and 7C are charts which explain the operation of the control circuit of the camera, wherein FIG. 7A shows camera tracks on the photographic negative film, FIG. 7B shows the waveform of a recording signal when the direct current is supplied to the magnetic head, and FIG. 7C shows a signal played back from the camera tracks shown in FIG. 7A;

FIGS. 8A and 8B are charts which explain the operation of the control circuit of the photographic printer, wherein FIG. 8A shows the waveform of a recording signal when the direct current is supplied to the magnetic head, and FIG. 8B shows processing laboratory tracks on the negative film;

FIGS. 9A, 9B and 9C are charts which explain the operation of the control circuit of the camera, wherein FIG. 9A shows the camera tracks on the photographic negative film, FIG. 9B shows the waveform of a recording signal when the alternating current is supplied to the magnetic head, and FIG. 9C shows a signal played back from the camera tracks shown in FIG. 9A;

FIGS. 10A and 10B are charts which explain the operation of the control circuit of the photographic printer, wherein FIG. 10A shows the waveform of a recording signal when the alternating current is supplied to the magnetic head, and FIG. 10B shows the processing laboratory tracks on the photographic negative film.

DESCRIPTION OF THE PREFERRED EMBODIMENT

Figure 1:
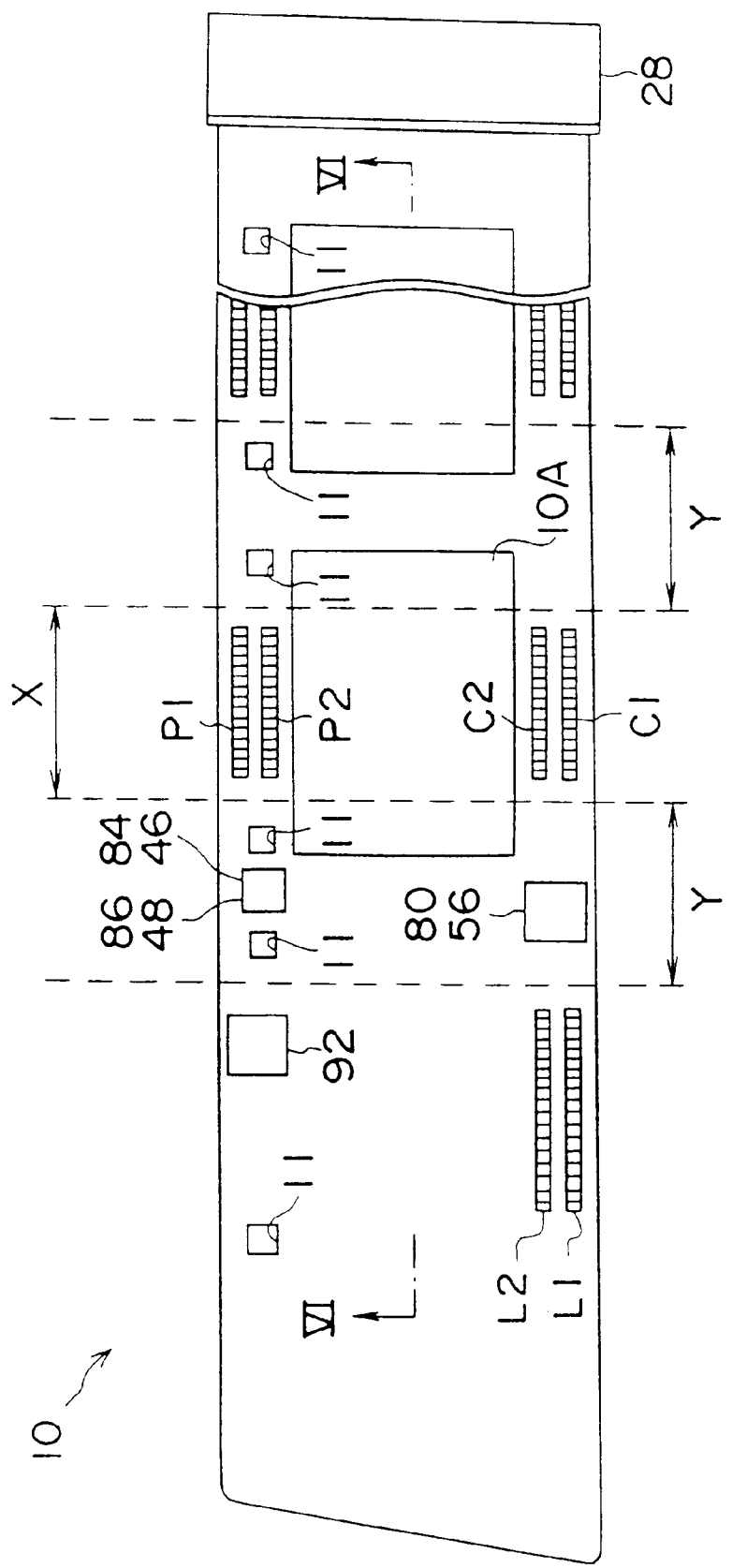
FIG. 1 is a plan view of a photographic negative film which is used in an embodiment of the present invention.
Figure 2:
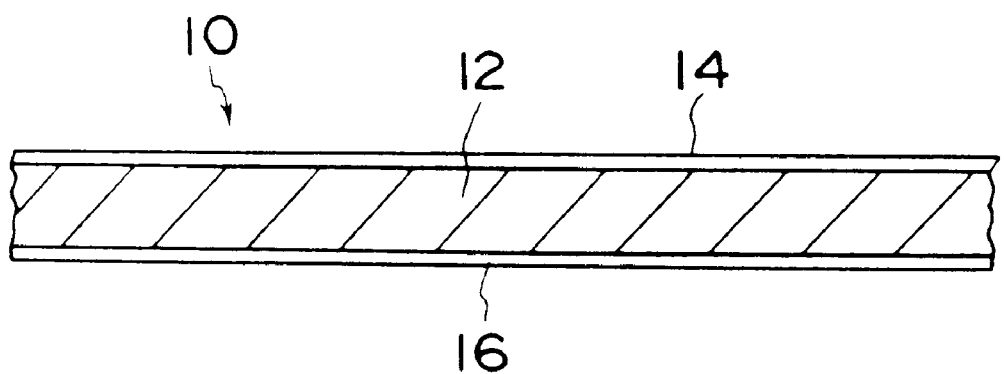
FIG. 2 is a cross section of the photographic negative film taken along the line VI—VI in FIG. 1.

An embodiment of the present invention will be described in detail with reference to the accompanying drawings. FIGS. 1 and 2 show a photographic negative film 10. An emulsion layer 14 is formed on an upper surface of a transparent film base 12 of the photographic negative film, as viewed in FIG. 2, so as to record an image on the photographic negative film 10 by the exposure process. A magnetic recording layer 16 is formed on a lower surface of the film base 12, as viewed in FIG. 2, by applying a transparent magnetic substance to the lower surface of the film base. As shown in FIG. 1, the magnetic recording layer 16 is provided over the entire surface of the photographic negative film 10, and is divided into signal unrecordable regions Y and signal recordable regions X. A plurality of recording tracks are formed in the signal recordable regions X along the longitudinal direction of the photographic negative film 10. The recording tracks include tracks L1 and L2 provided at the leading end portion of the photographic negative film 10 where image frames 10A will not be formed, and camera tracks C1 and C2 and processing laboratory tracks P1 and P2 provided for each image frame 10A. Although FIG. 1 shows one complete image frame 10A only, the photographic negative film 10 actually includes many image frames 10A, for each of which the camera tracks C1 and C2 and the processing laboratory tracks P1 and P2 are provided.

On the tracks L1 and L2, an information needed for each photographic negative film 10 is recorded. On the camera tracks C1 and C2 and the processing laboratory tracks P1 and P2, an information needed for each image frame 10A is recorded. At a leading end and a tailing end of each track, clock signals are magnetically recorded in a production step, or when the photographic negative film 10 has not been used yet, so that a signal including a series of pulses having a predetermined frequency is played back from the leading end and the tailing end of each track. The clock signals are used for detecting the speed of transportation of the photographic negative film 10 when information is recorded on or played back from each track. Also, two perforations 11 are provided for each image frame 10A.

Figure 3:
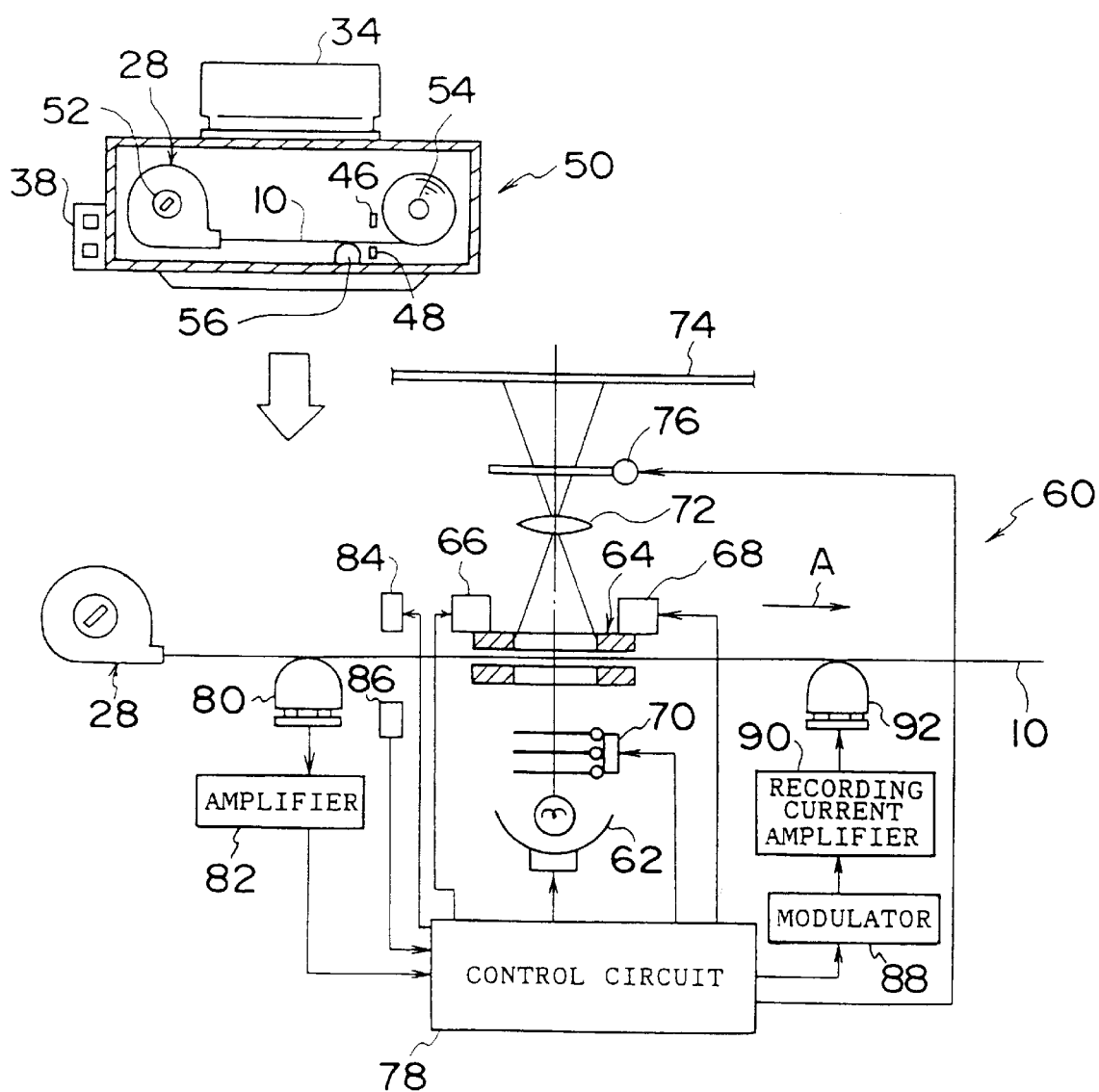
FIG. 3 is a schematic diagram showing the structure of a photographic processing system according to the embodiment.

FIG. 3 shows a camera 50 and a photographic printer 60 according to the present embodiment. In the camera 50, a cartridge 28 containing the photographic negative film 10 rolled around a spool 52 is loaded on one side thereof. Also, a driving reel 54 is provided on the opposite side thereof so as to convey and receive the photographic negative film 10. The camera 50 includes an optical system 34 composed of unillustrated lenses, a shutter and the like, and an operating section 38 for inputting an information of a user's identification, a name, an address, and other information such as a title, keywords, the place of photographing. Moreover, a magnetic head 56 is provided in the camera 50 at a location on the photographic negative film 10 and corresponding to the camera tracks C1 and C2 (see FIG. 1). Also, a light-emitting device 46 for emitting infrared rays and a light-detecting device 48 for receiving the infrared rays are provided at locations corresponding to the perforations 11 (see FIG. 1) so as to detect the perforations 11, which are formed for each image frame 10A of the photographic negative film 10.

Figure 4:
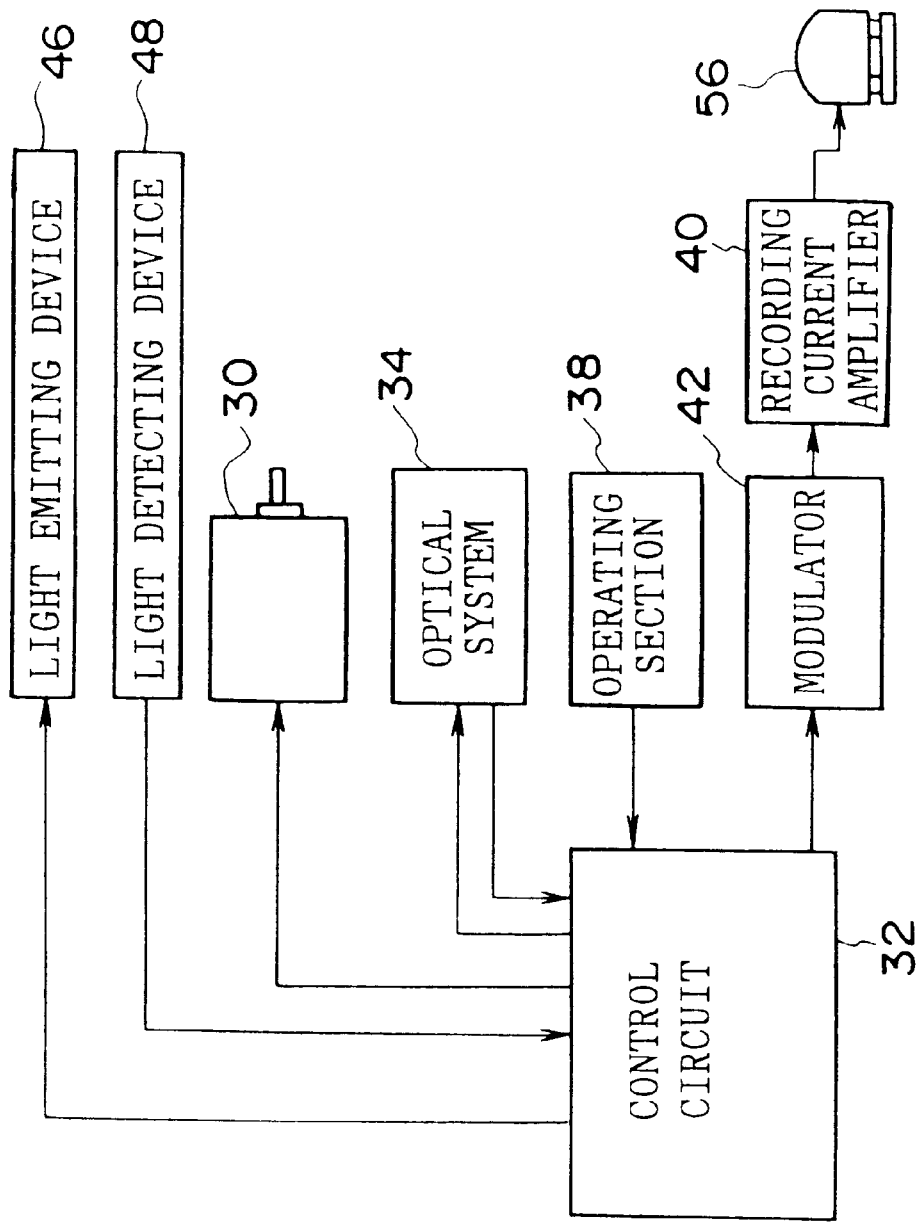
FIG. 4 is a schematic block diagram showing the structure of a camera.

FIG. 4 shows a control circuit 32 of the camera 50 which has the above-described structure. A motor 30 for driving the driving reel 54, the optical system 34, and the operating section 38 are connected to the control circuit 32. Also, the light-emitting portion 46 and the light-detecting portion 48 are connected to the control circuit 32. Moreover, the magnetic head 56 is connected to the control circuit 32 via a modulator 42 and a recording current amplifier 40.

In the photographic printer 60 shown in FIG. 3, a negative film carrier 64 is located on an optical axis of a light source 62 which emits light during the exposure process. The negative film carrier 64 is provided with unillustrated drive rollers which are rotated by driving force of a driving section 66 connected to a control circuit 78. The photographic negative film 10 is conveyed by the driving rollers in the direction indicated by arrow A in FIG. 3. The negative film carrier 64 is also provided with a solenoid 68 for press-holding the photographic negative film 10 at an exposure position in response to a signal from the control circuit 78.

Filters 70 for cyan, magenta and yellow are interposed between the light source 62 and the negative film carrier 64. Each filter is placed on and retracted from the optical axis in accordance with the amount of exposure for each color. Light passing through the photographic negative film 10 is irradiated on a photographic printing paper 74 via a lens 72 to expose an image on the photographic printing paper 74. A shutter 76 movably located between the photographic printing paper 74 and the lens 72 is retracted from the optical axis in response to a signal from the control circuit 78. Also, a playback head 80 is located on a transportation path for the photographic negative film 10 on the upstream of the negative film carrier 64. An output terminal of the playback head 80 is connected to an amplifier 82, and an output terminal of the amplifier 82 is connected to the control circuit 78. The playback head 80 is located at a location corresponding to the camera tracks C1 and C2 of the photographic negative film 10 (see FIG. 1).

On the downstream of the negative film carrier 64, a recording head 92 which records magnetically an information on each track of the magnetic recording layer 16 is located at a location corresponding to laboratory tracks P1 and P2 of the photographic negative film 10 (see FIG. 1). The recording head 92 is connected to the control circuit 78 via a recording current amplifier 90 and a modulator 88.

In the photographic printer 60, a light-emitting portion 84 for emitting infrared rays and a light-detecting portion 86 for receiving the infrared rays are oppositely provided at locations corresponding to a path of the perforations 11 of the photographic negative film 10 (see FIG. 1) so as to detect the perforation 11. The light-emitting portion 84 and the light-detecting portion 86 are connected to the control circuit 78.

An operation of the present embodiment is described with reference to the flowchart shown in FIG. 5 which explains a control routine of the control circuit 32 in the camera 50, and the flowchart shown in FIG. 6 which explains a control routine of the control circuit 72 in the photographic printer 60.

First, an operation of the camera 50 will be described. When the cartridge 28 is loaded in the camera 50, the photographic negative film 10 is pulled out of the cartridge 28 in step 102 so as to start the transportation of the photographic negative film 10. When the perforation 11 passes through the optical axis of the light-emitting portion 46 and the light-detecting portion 48 due to the transportation of the photographic negative film 10, the light-detecting portion 48 receives infrared rays from the light-emitting portion 46. The light-detecting device 48 outputs a predetermined signal to the control circuit 32 upon receipt of the infrared rays from the light-emitting portion 46. In step 104, it is judged whether the first perforation 11 is detected or not by determining whether the predetermined signal has been input from the light-detecting portion 48. When the first perforation 11 is detected, it is judged in step 106 whether the photographic negative film has been transported by a predetermined amount. When it is judged that the photographic negative film has been transported by the predetermined amount, it means that the magnetic head 56 faces the leading ends of the tracks L1 and L2. In a such case, the processing moves to step 108 to supply the modulator 42 with information (binary data) such as a user's ID, name, address, title and keywords, etc., which are input through the operating section 38. The modulator 42 converts the information thus input thereto to a recording signal S1 shown in FIG. 7B. The recording signal S1 is supplied to the magnetic head 56 after being amplified by the recording current amplifier 40. With this operation, the above-described information is recorded on the tracks L1 and L2.

Figure 7A:
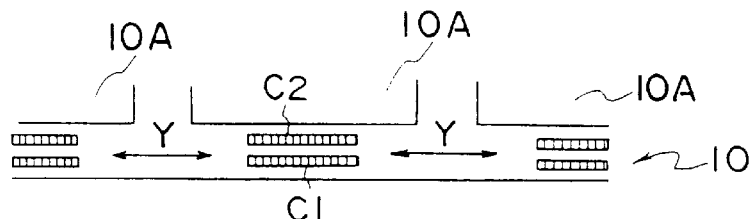
Figure 7B:
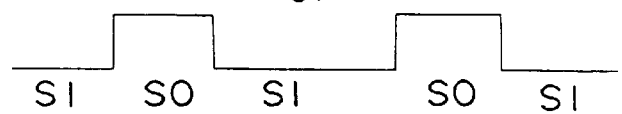

After the information is magnetically recorded on the tracks L1 and L2, direct current having a magnitude substantially equal to the optimal recording current of the magnetic head is supplied to the modulator 42 in step 110. The current thus input is converted to a signal by the modulator 42, and is amplified by the recording current amplifier 40 to be supplied to the magnetic head 56. With this operation, the magnetic head 56 is supplied with a signal S0, which has been obtained by converting and amplifying direct current having a magnitude substantially equal to the optimal recording current of the magnetic head, following the recording signal S1 corresponding to the negative film information, as shown in FIG. 7B.

In step 112, it is Judged whether an odd perforation 11 is detected, based on the contents of an unillustrated counter of the controller 32 which counts the predetermined signal from the light-detecting device 48. When the odd perforation 11 is detected, the processing moves to step 114 to position the photographic negative film 10 based on the position of the detected perforation 11. Also, it is Judged in step 116 whether a signal indicating the activation, "ON" of the shutter has been received from the operation section 38. When this signal has been input and received, the optical system 34 is operated in step 118 so as to record an image on the photographic negative film 10.

Figure 7C:
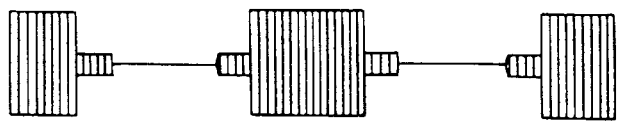

In step 120, the transportation of the negative film is started. In step 122, the modulator 42 is supplied with information representing photographing conditions of each image frame such as the aspect ratio of each frame 10A, an exposure amount at the time of photographing, information on a light source, etc. The modulator 42 converts the information representing the input photographing conditions into the recording signal S1, and outputs the converted signal to the recording current amplifier 40. The recording current amplifier 40 amplifies the recording signal thus input and outputs the amplified signal to the magnetic head 56. With this operation, the magnetic head 56 magnetically records the information of the photographing conditions on the camera tracks C1 and C2 in accordance with the recording signal S1. In the next step 124, direct current corresponding to the above-described recording signal S0 (direct current having a magnitude substantially equal to the maximum level of the optimal recording current of the magnetic head) is supplied to the modulator 42. With this operation, the magnetic head 56 is supplied with the signal S0, which has been obtained by converting and amplifying direct current having a magnitude substantially equal to the optimal recording current of the magnetic head, following the recording signal S1 corresponding to the information representing photographing conditions, as shown in FIG. 7B. Accordingly, when the signal recorded on the camera tracks C1 and C2 is played back in the photographic printer 60, the amplitude of the signal thus played back becomes zero at the regions where direct current was supplied to the modulator 42, as shown in FIG. 7C. Accordingly, noise does not exist in the playback signal.

In step 126, it is judged, based on the impossibility of further transportation of the photographic negative film 10, whether the tailing end of the photographic negative film 10 is detected. When the tailing end is not detected, the processing moves back to step 112 to repeat the processing such as image recording (steps 112–126). On the other hand, when the tailing end of the photographic negative film 10 is detected, the photographic negative film 10 is rewound to the spool 52 of the cartridge 28 in step 128 to complete the above-described control.

In the above-described embodiment, the recording signal S1 and the signal S0 are output to the magnetic head 56 whenever every image is recorded on the photographic negative film 10 (i.e., whenever the negative film is wound after each image frame is recorded). However, the method of recording the signals S1 and S0 is not limited thereto, and may be modified such that when the magnetic head faces the camera tracks, which are formed corresponding to each image frame, during a rewinding operation, information representing the above-described photographing conditions is output to the modulator, and that when the magnetic head is located in each non-recording region of the negative film, direct current having a magnitude substantially equal to the optimal recording current of the magnetic head is supplied to the modulator.

The camera can perform the process for supplying the modulator with direct current having a magnitude substantially equal to the optimal recording current of the magnetic head when the magnetic head is located in each non-recording region of the negative film. Moreover, this process may be carried out in the photographic printer 60 in a laboratory.

After the photographic negative film 10 is rewound back into the cartridge 28 upon completion of photographing, the cartridge 28 is taken in a DPE shop for development and printing. The photographic negative film 10 received by the DPE shop undergoes various processes including development, fixing, water-washing, and drying at a large-scale laboratory or a small-scale laboratory. In the case of simultaneous printing, the photographic negative film 10 is loaded into a predetermined portion of the photographic printer 60.

Next, the operation of the photographic printer 60 will be described with reference to FIG. 6. Upon completion of loading of the cartridge 28 to a photographic printer 60, the photographic negative film 10 is transported by the drive section 66 of the negative film carrier 64 in step 142. When the track L1 reaches the position corresponding to the playback head 80, a clock signal is read out by the playback head 80. In step 144, it is judged whether the clock signal has been picked up. When it is judged the clock signal has been picked up, the clock signal is reproduced in step 146 to control the drive section 55, based on the reproduced clock signal, such that the transportation speed of the photographic negative film 10 is maintained equal to or higher than the predetermined value.

When the playback head 80 reaches the leading ends of the camera tracks C1 and C2 due to the transportation of the photographic negative film 10, information which represents photographing conditions and is recorded on the camera tracks C1 and C2 is played back by the playback head 80. A weak playback signal output from the playback head 80 is amplified by the amplifier 82, and is output to the control circuit 78. In step 148, it is judged whether the playback signal of the information which represents photographing conditions and is recorded on the camera tracks C1 and C2 has been input. When it is judged that the playback signal has been input, the photographing conditions are reproduced in step 150.

Figure 8A:
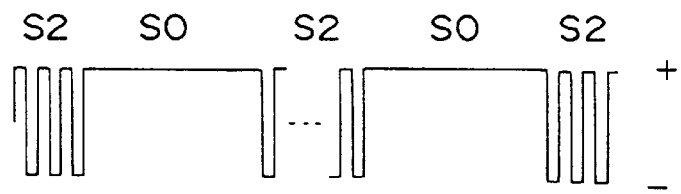
Figure 8B:
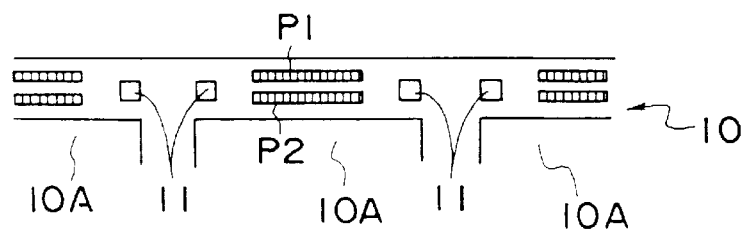
Figure 9A:
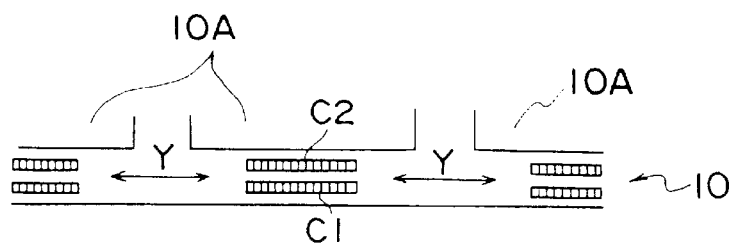
Figure 9B:
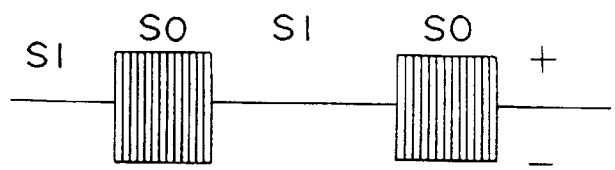
Figure 9C:
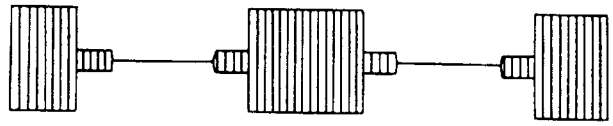
Figure 10A:
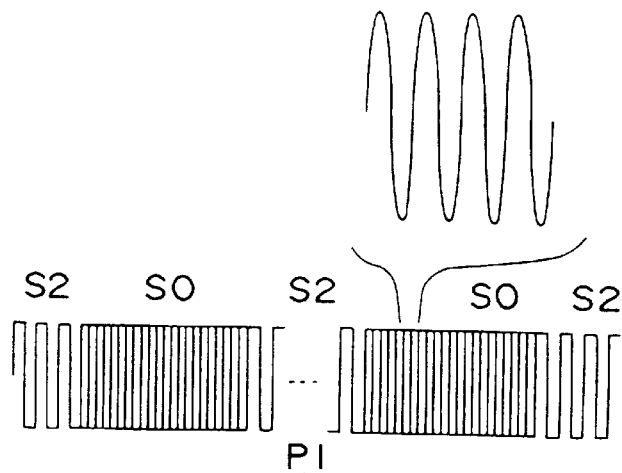
Figure 10B:
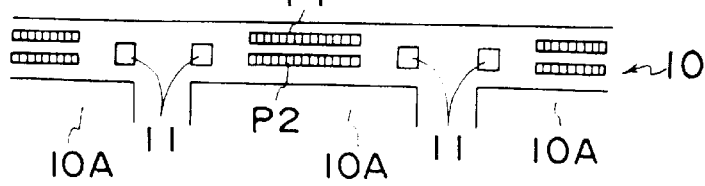
Figure 11A:
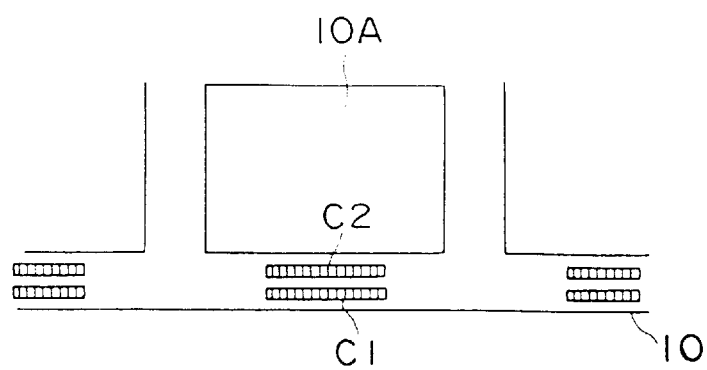
FIG. 11A shows camera tracks on a photographic negative film of a prior art.
Figure 11B:
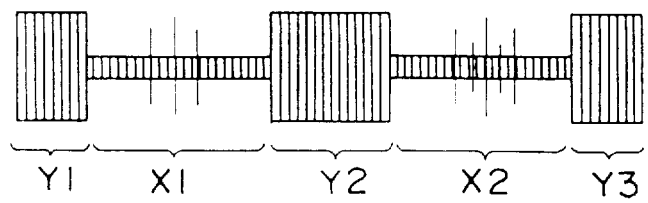
FIG. 11B shows a signal played back from the camera tracks of the prior art.

In step 152, the perforation 11 is detected in the above-described manner to position the image frame 10A based on the detected perforation 11. In step 154, a printing process is carried out in accordance with the reproduced photographing conditions. In detail, the density of each image frame is measured by an unillustrated densitometer, and exposure conditions are determined based on the measured density and information representing the photographing conditions. The image recorded on the photographic negative film 10 is printed on the photographic printing paper 74 under the exposure conditions thus set. After the photographic negative film 10 is transported in step 156, information representing the exposure conditions, designation of printing, etc., is output to the modulator 88. The modulator 88 converts the information representing the exposure conditions, designation of printing, etc., into a recording signal and outputs the recording signal to the recording current amplifier 90. The recording current amplifier 90 amplifies the recording signal thus input and outputs the amplified signal to the recording head 92. With this operation, the recording head 92 is supplied with a recording signal S2 shown in FIG. 8A so that the above-described information is magnetically recorded on the processing laboratory tracks P1 and P2. The information recorded on the processing laboratory tracks P1 and P2 is played back in a subsequent step in the same manner as described above. In the present embodiment, the information representing the exposure conditions, designation of printing, etc., is output to the modulator 88 after each image recorded on the photographic negative film 10 is printed on the photographic printing paper 74. However, each image recorded on the photographic negative film 10 may be printed on the photographic printing paper 74 after the information representing said exposure conditions, designation of printing, etc., is output to the modulator 88. In the next step 160, the direct current having the magnitude substantially equal to the optimal recording current of the magnetic head is supplied to the modulator 88. With this operation, the magnetic head 88 is supplied with the signal S0, which has been obtained by converting and amplifying the direct current having a magnitude substantially equal to the optimal recording current of the magnetic head, following the recording signal S2 corresponding to the above-described information, as shown in FIG. 8A. In step 162, it is judged whether the printing process has been completed for all the image frames 10A. When it is judged that the printing process has not been completed for all the image frames 10A, the processing moves back to step 148 to repeat the processing such as printing process (steps 148–162). On the other hand, when it is judged that the printing process has been completed for all the image frames 10A, the above-described control is ended.

In the present embodiment described above, the direct current having a magnitude substantially equal to the maximum level of the recording signal is supplied to the magnetic head after the completion of supplying a recording signal corresponding to information of exposure conditions, designation of printing, etc., to the magnetic head. Accordingly, invasion of noise is prevented, and a signal corresponding to the recorded information is prevented from remaining on the magnetic tracks, thereby improving the readability of information.

In the above-described embodiment, the direct current is supplied to the modulator when no information is recorded. However, the present invention is not limited thereto, and predetermined alternating current may be (supplied to the modulator, as shown in FIGS. 9A, 9B and 9C, and FIGS. 10A and 10B. In this case, it is preferred that the alternating current have a rectangular waveform or a sine waveform having a frequency not less than 5 times, preferably 10 times the frequency of the recording signal. When the alternating current of a rectangular waveform or a sine waveform has a frequency not less than 5 times the frequency of the recording signal, noise and a remaining signal corresponding to the recorded information can be erased. However, in the case where the alternating current of the rectangular waveform or the sine waveform has a frequency not less than 10 times the frequency of the recording signal, noise and a remaining signal corresponding to the recorded information can be erased more completely.

In the present embodiment, the present invention is applied to the camera 50 and the photographic printer 60. However, the present invention is not limited thereto and may be applied to various apparatus in which information is recorded to and played back from tracks formed on the magnetic recording layer 16 during a photographic process. For example, the present invention can be applied to a splicer for connecting a plurality of photographic negative films with a splicing tape, a printer processor in which a printer and a processor are integrally combined, a photographic developer in which images recorded on the photographic negative film are developed while the photographic negative film is automatically transported through the developing section, fixing section, water-washing section and drying section, a printer for reprinting, and a simple printer of a thermal type or an ink jet type. The present invention can also be applied to an attacher, a photographic negative film transporter disposed on the front and back portions of the printer, a collating apparatus, i.e., a tester for collating or testing images on the negative film, and a re-winding unit for re-winding the negative film held in the cartridge used in the above described embodiment to eliminate curls of the photographic negative film. Moreover, the present invention can be applied to a display device for displaying on a CRT images recorded on a film.

In the above-described embodiment, the information is magnetically recorded on a magnetic recording section provided on the photographic negative film. However, the present invention is not limited thereto, and may be applied to all the cases where binary data are serially recorded on a magnetic recording medium.

Although the negative film is moved relative to the magnetic head, the recording head and the playback head in the above-described embodiment, the present invention is not limited thereto and may be applied to the cases where the magnetic head, the recording head and the playback head are moved relative to the photographic negative film, and to the cases where the magnetic head, the recording head and the playback head, and the photographic negative film are both moved.

As described above, the direct current or alternating current is supplied to the magnetic head when the magnetic head is located outside a predetermined region of the magnetic track on the photographic negative film. Accordingly, invasion of noise is prevented, and the signal corresponding to the recorded information is prevented from remaining on the magnetic track, thereby improving the readability of the information magnetically recorded on the magnetic track.

What is claimed is:

1. An information recording method comprising the steps of:

causing relative movement between a photographic negative film, provided with a magnetic track, and a magnetic head;

supplying said magnetic head with a signal corresponding to an information to be magnetically recorded so as to magnetically record the information in a first predetermined region of said magnetic track;

recording said information on said first predetermined region of said magnetic track of said photographic negative film on the basis of said signal supplied to said magnetic head;

supplying said magnetic head with a second signal when said magnetic head is located at a second predetermined region which is outside said first predetermined region, said second signal being one of direct current and alternating current; and operating said second signal on said second predetermined region of said photographic negative film through said magnetic head.

2. An information recording method according to claim 1, wherein the frequency of said alternating current is not less than 5 times the maximum frequency of said signal.

3. An information recording method according to claim 1, wherein the magnitude of said direct current is substantially equal to an optimal recording current of the magnetic head.

4. An information recording method according to claim 1, wherein said photographic negative film is provided with a plurality of pairs of perforations which pairs are formed at least at one side edge of said photographic negative film at a predetermined interval in the longitudinal direction of said photographic negative film, said perforations in each pair being separated from each other by an amount equal to the length, in said longitudinal direction, of each image region in which the image of an object is recorded.

5. An information recording method according to claim 4, wherein said first predetermined region is the region between said perforations in each pair.

6. An information recording method according to claim 1, wherein said relative movement between said photographic negative film and said magnetic head is effected whenever the negative film is wound by a predetermined amount in said camera.

7. An information recording method according to claim 1, wherein said relative movement between said photographic negative film and said magnetic head is effected when said photographic negative film is rewound after images of objects are recorded on all the image regions by said camera.

8. An information recording method according to claim 1, wherein said relative movement between said photographic negative film and said magnetic head is repeatedly effected before or after an image in each image frame is exposed and printed on a photographic printing paper by an exposure/printing apparatus.

9. An information recording method according to claim 1, wherein said relative movement between said photographic negative film and said magnetic head is effected when said photographic negative film is rewound after said image in a predetermined number of image areas, which was recorded by a camera, are exposed and printed on a photographic printing paper by an exposure/printing apparatus.

10. An information recording method according to claim 1, wherein said second predetermined region is located adjacent to said first predetermined region.

11. An information recording method comprising the steps of:
   recording magnetically an information, with a magnetic head of a recording apparatus, in a first region corresponding to an image frame of a photographic negative film which has a magnetically recording portion; and
   operating one of direct current and alternating current, with said magnetic head, on a second region which is outside of said first region of said photographic negative film.

12. An information recording method according to claim 11, further comprising the steps of:
   causing relative movement between said photographic negative film and said magnetic head;
   transmitting a signal corresponding to said information to be magnetically recorded in said first region to said magnetic head; and
   supplying said one of the direct current and the alternating current to said magnetic head when positioned at a second region, wherein said one of the direct current and the alternating current is operated to said second region to prevent said second region from mixing noise.

13. An information recording method according to claim 12, wherein said relative movement between said photographic negative film and said magnetic head is repeatedly effected before or after an image in each image frame is printed on a photosensitive material by a printer, or is effected when said photographic negative film is rewound after said image which was recorded by a camera is printed on a photosensitive material by said printer.

14. An information recording method according to claim 11, wherein the magnitude of the direct current is substantially equal to an optimal recording current of the magnetic head, and the frequency of said alternating current is not less than 5 times the maximum frequency of the signal.

15. An information recording apparatus comprising:
   a magnetic head;
   moving means for causing relative movement between said magnetic head and a photographic negative film; and
   supplying means, adapted to operate when the relative movement between said magnetic head and said photographic negative film having a magnetic track is being effected, for supplying said magnetic head with a signal corresponding to information to be magnetically recorded when said magnetic head is located in a first predetermined region of the magnetic track on the photographic negative film to record said information on said first predetermined region of said magnetic track of said photographic negative film on the basis of said signal supplied to said magnetic head, and for supplying said magnetic head with a second signal when said magnetic head is located in a second predetermined region outside the first predetermined region of the magnetic track, said second signal being one of direct current and alternating current.

16. An information recording apparatus according to claim 15, wherein the frequency of said alternating current is not less than 5 times the maximum frequency of the signal.

17. An information recording apparatus according to claim 15, wherein the magnitude of the direct current is substantially equal to an optimal recording current of the magnetic head.

18. An information recording apparatus according to claim 15, wherein said photographic negative film is provided with a plurality of pairs of perforations which pairs are formed at least at one side edge of said photographic negative film at a predetermined pitch in the longitudinal direction of said photographic negative film, said perforations in each pair being separated from each other by an amount equal to the length, in said longitudinal direction, of each image region in which the image of an object is recorded.

19. An information recording apparatus according to claim 18, wherein said first predetermined region is the region between said perforations in each pair.

20. An information recording apparatus according to claim 15, wherein said magnetic head is disposed in said camera at a position such that said magnetic head corresponds to said magnetic track of said photographic negative film which is loaded in said camera.

21. An information recording apparatus according to claim 15, wherein said magnetic head is disposed in said exposure/printing apparatus at a position such that said magnetic head corresponds to said magnetic track of said photographic negative film which is loaded in said exposure/printing apparatus.

* * * * *

UNITED STATES PATENT AND TRADEMARK OFFICE
CERTIFICATE OF CORRECTION

PATENT NO. : 6,388,828 B1  Page 1 of 1
APPLICATION NO. : 08/711074
DATED : May 14, 2002
INVENTOR(S) : Uekusa It is certified that error appears in the above-identified patent and that said Letters Patent is hereby corrected as shown below:

On the title page,
Item [*] delete "0" and insert --1293--.

Signed and Sealed this

Fifth Day of December, 2006

JON W. DUDAS
*Director of the United States Patent and Trademark Office*